United States Patent
Cronin

(10) Patent No.: US 9,161,193 B1
(45) Date of Patent: Oct. 13, 2015

(54) ADVANCED TELEPHONE MANAGEMENT

(71) Applicant: GrandiOs Technologies, LLC, Wilmington, DE (US)

(72) Inventor: John Cronin, Bonita Springs, FL (US)

(73) Assignee: GrandiOs Technologies, LLC, Wilmington, DE (US)

( * ) Notice: Subject to any disclaimer, the term of this patent is extended or adjusted under 35 U.S.C. 154(b) by 0 days.

(21) Appl. No.: 14/624,082

(22) Filed: Feb. 17, 2015

Related U.S. Application Data

(60) Provisional application No. 62/007,882, filed on Jun. 4, 2014.

(51) Int. Cl.
| | |
|---|---|
| *H04M 3/42* | (2006.01) |
| *H04W 4/16* | (2009.01) |
| *H04W 76/04* | (2009.01) |
| *H04M 3/436* | (2006.01) |
| *H04W 4/14* | (2009.01) |
| *H04M 1/725* | (2006.01) |

(52) U.S. Cl.
CPC ............ *H04W 4/16* (2013.01); *H04M 1/72522* (2013.01); *H04M 3/436* (2013.01); *H04W 4/14* (2013.01); *H04W 76/04* (2013.01)

(58) Field of Classification Search
CPC ........... H04W 4/00; H04W 4/16; H04W 8/18; H04W 8/20; H04W 76/06; H04W 4/14; H04W 76/04; H04M 1/72522; H04M 3/436
USPC .............. 455/412.1, 412.2, 414.1–414.4, 466
See application file for complete search history.

(56) References Cited

U.S. PATENT DOCUMENTS

| | | | |
|---|---|---|---|
| 7,986,716 B2 | 7/2011 | Veeramachaneni et al. | |
| 8,175,644 B1 | 5/2012 | Jeffrey | |
| 8,548,444 B2 * | 10/2013 | Channakeshava et al. | 455/414.1 |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |

(Continued)

OTHER PUBLICATIONS

About Retina-X Studios, LLC, "The Creators of Mobile Spy Software" Date of Download: Feb. 5, 2014 http://www.mobile-spy.com/retinax.html.

(Continued)

*Primary Examiner* — Amancio Gonzalez
(74) *Attorney, Agent, or Firm* — Lewis Roca Rothgerber LLP

(57) ABSTRACT

Methods and systems for providing telephone management are provided. Information may be stored in memory of a first mobile device. Such stored information may concerns a plurality of other mobile devices. A telephone call may be connected between the first mobile device and a second mobile device. A request may be received from a user of the first mobile device concerning manipulating data concerning the telephone call with the second mobile device. Information regarding the second mobile device may be identified and matched to the stored information. Such a match may indicate that the second mobile device is enabled for manipulation of telephone call data during telephone calls. As such, the telephone call data may be manipulated during the telephone call in accordance with the user request.

21 Claims, 9 Drawing Sheets

(56) References Cited

U.S. PATENT DOCUMENTS

| | | | |
|---|---|---|---|
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 2008/0293432 A1 | 11/2008 | Stewart et al. | |
| 2011/0267367 A1 | 11/2011 | Tsai et al. | |
| 2012/0197523 A1 | 8/2012 | Kirsch | |
| 2013/0282692 A1* | 10/2013 | Kruglick | 707/710 |
| 2013/0303192 A1 | 11/2013 | Louboutin | |
| 2013/0317835 A1 | 11/2013 | Mathew | |
| 2013/0326368 A1 | 12/2013 | Voas et al. | |
| 2013/0328917 A1 | 12/2013 | Zhou | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0343311 A1 | 12/2013 | Tee et al. | |
| 2013/0344872 A1 | 12/2013 | Nukala et al. | |
| 2014/0004837 A1 | 1/2014 | Varoglu et al. | |
| 2014/0026223 A1 | 1/2014 | Dave et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0240440 A1* | 8/2014 | Seo et al. | 348/14.03 |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026623 A1 | 1/2015 | Horne | |
| 2015/0031397 A1 | 1/2015 | Jouaux | |

OTHER PUBLICATIONS

Falaki, Hossein; "A First Look at Traffic on Smartphones" Date of Download: Feb. 4, 2014.

Mobile Device Management (MDM)—Manage BYOD Devices, BlackBerry for Business; Date of Download: Feb. 4, 2014.

Schulman, Aaron; "Bartendr: A practical approach to energy-aware cellular data scheduling" ACM Digital Library, Date of Download: Feb. 4, 2014.

Qian, Feng; "Characterizing Radio Resource Allocation for 3G Networks" ACM Digital Library, Date of Download: Feb. 4, 2014.

Qian, Feng; "Profiling Resource Usage for Mobile Applications: A cross-layer approach" ACM Digital Library, Date of Download: Feb. 4, 2014.

* cited by examiner

ADVANCED TELEPHONE MANAGEMENT

CROSS-REFERENCE TO RELATED APPLICATIONS

The present application claims the priority benefit of U.S. provisional application No. 62/007,882 filed Jun. 4, 2014 and entitled "Advanced Telephone Management," which is hereby incorporated by reference.

BACKGROUND

1. Field of the Invention

The present invention generally relates to management of mobile devices. More specifically, the present invention relates to a telephone management system on mobile devices.

2. Description of the Related Art

Presently available mobile devices have a variety of basic phone settings. For example, a user may select settings to add a caller to an ongoing telephone call or merge several calls with different individuals into a single call. Generally, a user may select settings to provide some level of phone management, such as when to receive a call, when shut off certain calls (e.g., in the evening), selectively block certain callers, or allow a certain caller at a certain time, etc.

There are, further, many applications available (e.g., via download from an App Store) that may be used to enhance communications between phone users. For example, such enhancements may include an application for recording a phone call or an application that may be used for better contact management based on options for sharing certain data with a contact (e.g., vCards, photos, etc.).

There is, however, no common local database or even a shared database within the operating system that allows for either integration or sharing of all these available functions from downloaded applications. Moreover, there is presently no telephone management system that integrates various phone functions and allows for sharing in real-time with designated OS callers (e.g., all functions within an operating system may be deployed during a telephone call). As such, many functions in current telephone operating systems may not be used or accessible during telephone calls.

There is, therefore, a need in the art for improved systems and methods of telephone management for mobile devices.

SUMMARY OF THE CLAIMED INVENTION

Embodiments of the present invention provide methods and systems for providing for advanced telephone management. Information may be stored in memory of a first mobile device. Such stored information may concerns a plurality of other mobile devices. A telephone call may be connected between the first mobile device and a second mobile device. A request may be received from a user of the first mobile device concerning manipulating data concerning the telephone call with the second mobile device. Information regarding the second mobile device may be identified and matched to the stored information. Such a match may indicate that the second mobile device is enabled for manipulation of telephone call data during telephone calls. As such, the telephone call data may be manipulated during the telephone call in accordance with the user request.

Various embodiments of the present invention may include methods for telephone management. Such methods may include storing information in memory of a first mobile device concerning a plurality of other mobile devices, connecting a telephone call between the first mobile device and a second mobile device, receiving a request from a user of the first mobile device concerning manipulating telephone call data, identifying information regarding the second mobile device, matching the identified information regarding the second mobile device to the stored information to indicate that the second mobile device is enabled for manipulation of telephone call data during telephone calls, and manipulating the telephone call data during the telephone call in accordance with the user request.

Embodiments may further include apparatuses for telephone management. Such apparatuses may include memory that stores information concerning a plurality of other mobile devices, a telephone interface that connects a telephone call between the first mobile device and a second mobile device, a user interface that receives a request from a user of the first mobile device concerning manipulating data concerning the telephone call with the second mobile device, and a processor that executes instructions to identify information regarding the second mobile device, to match the identified information regarding the second mobile device to the stored information to indicate that the second mobile device is enabled for manipulation of telephone call data during telephone calls, and manipulate the telephone call data during the telephone call in accordance with the user request.

Embodiments of the present invention may further include non-transitory computer-readable storage media, having embodied thereon a program executable by a processor to perform methods for providing for telephone management as described herein.

DETAILED DESCRIPTION

Embodiments of the present invention provide methods and systems for providing for telephone management. Information may be stored in memory of a first mobile device. Such stored information may concerns a plurality of other mobile devices. A telephone call may be connected between the first mobile device and a second mobile device. A request may be received from a user of the first mobile device concerning manipulating data concerning the telephone call with the second mobile device. Information regarding the second mobile device may be identified and matched to the stored information. Such a match may indicate that the second mobile device is enabled for manipulation of telephone call data during telephone calls. As such, the telephone call data may be manipulated during the telephone call in accordance with the user request.

Figure 1:
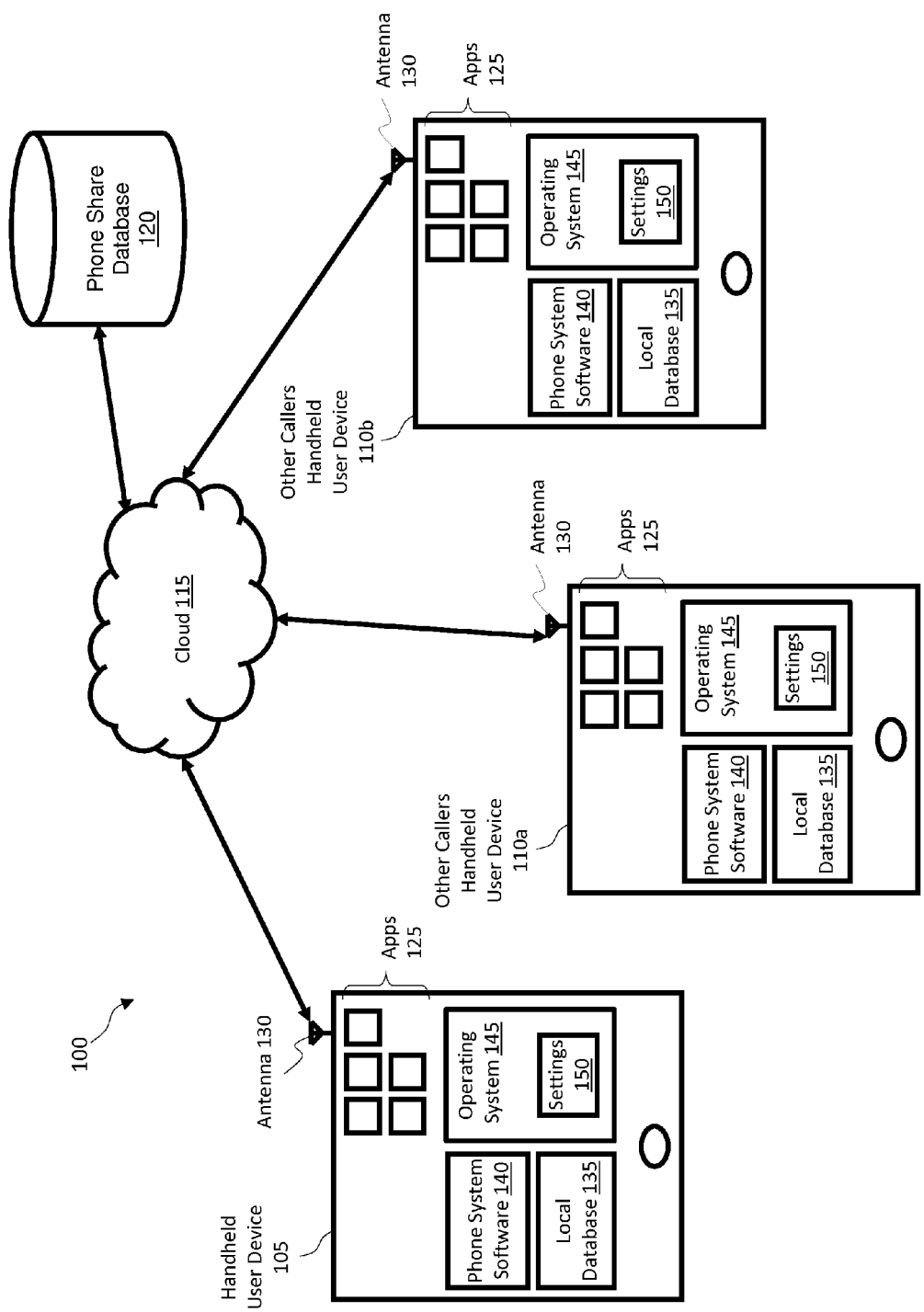
FIG. 1 illustrates an exemplary network environment in which a system for providing for telephone management may be implemented.

FIG. 1 illustrates an exemplary network environment 100 in which a system for providing for telephone management may be implemented. Network environment 100 may include handheld devices 105 and 110a-b, which communicate with phone share database 120 over cloud network 115.

Users may use any number of different electronic user devices 105 and 110a-b, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 115. User devices 105 and 110a-b may also be configured to access data from other storage media, such as memory cards or disk drives as may be appropriate in the case of downloaded services. User devices 105 and 110a-b may include standard hardware computing components such as network and media interfaces, non-transitory computer-readable storage (memory), and processors for executing instructions that may be stored in memory. User devices 105 and 110a-b may further include one or more applications 125, antennae 130, local database 135, phone system software 140, operating system 145, and operating system settings 150.

Applications 125 may include any number of software applications installed on the user device 105 and 110a-b, including native applications (e.g., Notes, Messages, Camera, FaceTime, Weather, etc. on iPhone) and downloaded applications (e.g., Facebook®, Twitter®, Instagram®).

Antenna 130 may be an antenna that allows user device 110 to communicate wirelessly over the communication network 115. Such antenna 130 may communicate over WiFi, 4G/3G, Bluetooth, and/or any other known radio frequency communication network known in the art.

Local database 135 may be any type of local database that stores a user's settings related to how the user wants to communicate, updating data, getting and managing share data with respect to the devices of other users (e.g., contacts), and/or allowing those other users to see information generated by the user at the user device 110. The local database 135 may be an organized collection of data, which may be typically organized to model relevant aspects of reality in a way that supports processes requiring this information. For example, such database 135 may include listings of applications by user (and by contacts of the user).

Such data as stored in local database 135 may include information generated during telephone calls between devices whose users have agreed to share telephone call data. In some embodiments, local database 135 may be updated via operating system settings 150. For example, the user may designate that the user wishes to share information regarding the user's telephone call and allow such shared data to be accessed by various applications 125.

Phone system software 140 may be a centralized set of settings for controlling the activity of the telephone (e.g., user device). The phone system software may be used to control the interaction of various applications set in the OS and the user device.

Operating system (OS) 145 is a collection of software that manages computer hardware resources and provides common services for computer programs, including applications 125. The operating system 145 is an essential component of the system software in a computer system. Applications 125 are usually developed for a specific operation system 145 and therefore rely on the associated operating system 145 to perform its functions. For hardware functions such as input and output and memory allocation, the operating system 145 acts as an intermediary between applications 125 and the computer hardware. Although application code is usually executed directly by the hardware, applications 125 may frequently make a system call to an OS function or be interrupted by it. Operating systems 145 can be found on almost any device with computing or processing ability. Examples of popular modern operating systems include Android, BSD, iOS, Linux, OS X, QNX, Microsoft Windows, Windows Phone, and IBM z/OS. Most of these (except Windows, Windows Phone and z/OS) may share roots in UNIX.

Operating system settings 150 may include a software function that opens a display that lists OS functions that may be generated upon selection of a user interface button. Such a list of OS functions may be associated with various options that allow the user to designate certain preferences or settings with respect to how certain operating system functions are performed (e.g., display preferences, wireless network preferences, information sharing, accessibility of applications to system information, such as GPS/location, notifications). Once these settings are set, the operating system 150 uses the settings to perform various functions, which includes functions related to execution of an application 125.

Each of the user devices 105 and 110a-b may have settings within the operating system. The user may set the settings for various applications in the operating system and also access the phone system software to further refine phone communication settings. The OS settings are described in more detail with reference to FIG. 2. The phone system software is described in more detail with reference to FIGS. 4 and 5. A user's OS settings and phone system software settings may be stored in the local database 135. If sharing is allowed, settings data may also be shared (e.g., via the cloud communication network 115) with the phone share database 120. Other users may also share their device setting profiles in the phone share database 120. When a call is initiated between at least two users of the handheld devices 105 and 110a-b, user profile settings may be compared in the local database 135 and/or share database 120 and if there are matches, advanced phone communications may then be allowed.

Cloud communication network 115 may be a local, proprietary network (e.g., an intranet) and/or may be a part of a larger wide-area network. Cloud communication network 115 may comprise a variety of connected computers that may provide a set of network-based services. Such network service may be provided by real server hardware and/or by virtual hardware as simulated by software running on one or more real machines. Such virtual servers may not physically exist and can therefore be moved around and scaled up (or down) on the fly without affecting end-users (e.g., like a cloud).

Cloud communication network 115 allow for communication between the user devices 105 and 110a-b and phone share database 120 via various communication paths or channels. Such paths or channels may include any type of data communication link known in the art, including TCP/IP connections and Internet connections via Wi-Fi, Bluetooth, UMTS, etc. In that regard, communications network 130 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Cloud communications network 115 allows for communication between any of the various components of network environment 100.

Phone share database 120 may organize data to support processes requiring this information. The phone share database, which is described in more detail with reference to FIG. 3, may include any type of data storage device known in the art. In the regard, phone share database 120 may be part of or affiliated with any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

Figure 2:
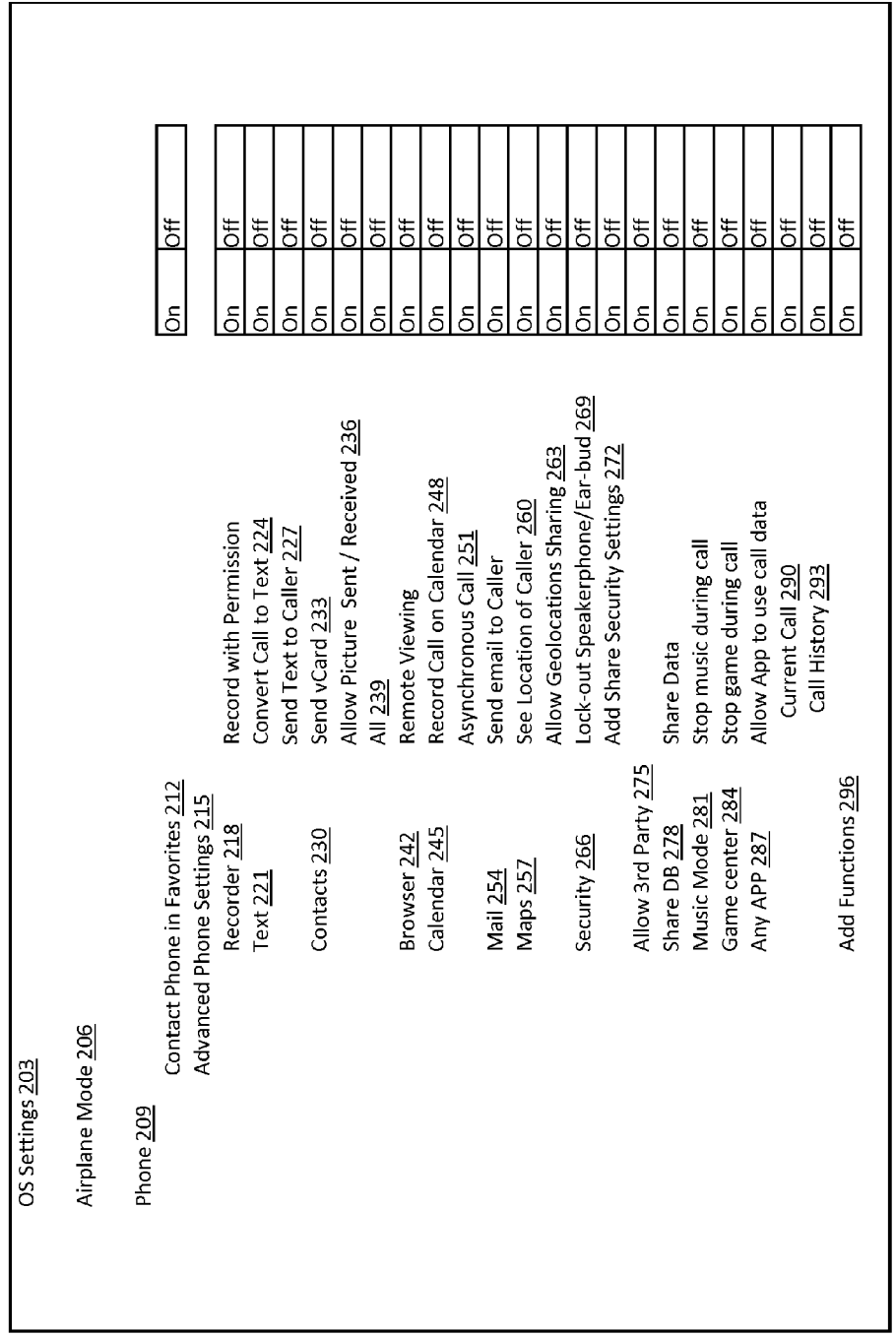
FIG. 2 is a diagram illustrating exemplary settings on a mobile device that may be used with a system for providing for telephone management.

FIG. 2 is a diagram illustrating exemplary settings 200 on a mobile device that may be used with a system for providing for telephone management. Such settings 200 control what type of data may be shared during telephone calls, as well as how such data is to be shared. Such settings 200 may include OS settings 203, airplane mode 206, and various other telephone settings 209.

OS settings 203 may provide a view of the settings functions available in the OS. OS settings 203 may include a software application for customizing and controlling various functions on a user device. From OS settings, a user may select a function to access a sub-menu of options for the selected function.

Airplane mode 206 may be a setting that, when activated, suspends many of the device's signal transmitting functions, thereby disabling the device's capacity to place or receive calls or use text messaging, while still permitting use of other functions that do not require signal transmission.

Such telephone settings 209 may be used to change the phone settings on a user device. From phone, a user may access a sub-menu of different phone functions. Telephone settings 209 may further include options for contact phone in favorites 212 and advanced phone settings 215. Contact phone in favorites 212 may include a software function that may be used to add a contact to a user's "favorites" list.

Advanced phone settings 215 may include setting that may be used to set phone functions for various software applications used to enhance communications between phone users. From advanced phone settings, a user may access a sub-menu of advanced phone setting options. In that regard, advanced phone settings 215 may further be associated with options for recorder 218, text 218 (e.g., converting call to text 224 or send text to caller 227), contacts 230 (e.g., send vCard 233, allow picture to be sent/received 236, or all 239), browser 242 (e.g., for remote viewing on browsers of other mobile devices), calendar 245 (e.g., record call on calendar 248 or asynchronous calling to voicemail 251), mail 254 (e.g., for sending email to caller), maps 257 (e.g., to see location of caller 260 or allow geolocations sharing 263), security 266 (e.g., to lock-out speakerphone/ear-bud 269 or add share security settings 272), allow third party 275 (e.g., receiving information from third parties such as security systems, business connections), share database 278 (e.g., for sharing data), music mode 281 (e.g., to stop music during a call), game center 284 (e.g., to stop game during a call), any app 287 (e.g., to allow app to use call data either regarding a current call 290 or regarding call history 293), and add functions 296. Such options may be enabled or disabled by the user in accordance with personal preferences, usage habits, or by default settings.

Recorder 218 may be a software function used to turn a recording app on or off. Recorder 218 may be used, for example, to record a phone call when both users have enabled the recorder setting. A more detailed description of user controlled settings for recorder functions during a phone call is described in more detail with reference to the phone system software described in FIG. 5.

Text 218 provides options for converting call to text 224 or sending text to caller 227. Convert call to text 224 may be used to turn a speech-to-text conversion app on or off. The speech-to-text app may be used, for example, to create a transcript of a phone call. Send text to caller 227 may be used to automatically set-up another device for instant messaging in text during a phone call. For example, send text to caller 227 may be used to send messages during a Skype call.

Contacts 230 includes options for allowing information about a user (e.g., vCard or picture) to be sent to another device. Send vCard 233 may be used to allow a user's vCard to be sent to another device. Such vCard may include, inter alia, the user's name, address information, phone number(s), e-mail address(es), photo, etc. Allow picture to be sent/received 236 may be used to allow a user's picture to be sent to another device or to receive a picture from the other device. All 239 may be used to allow any other user contact information to be sent to another device.

Browser 242 may be used to allow remote viewing of a user's browser content by a caller(s) during a phone call. Calendar 245 may include options for recording call on calendar 248 or asynchronous calling 251 (e.g., to voicemail). Record call on calendar 248 may be used to record a phone call on a user's calendar. The recorded information may include, inter alia, date and time the call was made, name, and/or number of the person called. Asynchronous calling 251 may be used to send a call directly to another device's voicemail so that a user does not have to speak with the other user directly. Asynchronous calling 251 may be used to leave reminder messages or to automatically enable asynchronous calling when a recipient is in a meeting.

Mail 254 may be used to connect to email when a call is initiated. Mail 254 allows email messages to be exchanged between device users during a phone call.

Maps 257 may include options for seeing location of caller 260 or allowing geolocations sharing 263. See location of caller 260 may be used to view the geolocation of another device. Geolocations sharing 263 may be used to enable or disable location-based services, as well as allow a user's geolocation data to be shared with another device.

Security 266 may include options to lock-out speakerphone/ear-bud 269 or add share security settings 272. Lock-out speakerphone/ear-bud 269 may be used to lock-out the use of speakerphone or ear-buds by the other device to ensure that the phone call is not being shared with others. Add share security settings 272 may be used to add other share security settings, such as deleting a caller's telephone number after a call is made.

Allow third party 275 may be used to allow a third party to view a user's settings profile stored in the phone share database. A third party may be, for example, a security system provider or a business connection. Share database 278 may be used to enable the phone share database. Music mode 281 may be used to stop (freeze) any music that may be playing when a call is initiated. Game center 284 may be used to stop (freeze) any games that may be playing when a call is initiated.

Any app 287 may be used to allow an application(s) installed on the user device to use the telephone call data. For example, an application on the user device may detect the telephone call data, generate a pop-up window, and allow a user to further select settings for that application. Current call 290 may be used to allow an application installed on a user's device to use data from a current phone call. Call history 293 may be used to allow an application installed on a user's device to use call history data.

Add functions 296 may be used to add other functions that may be integrated with other functions in the advanced phone settings within the operating system of a user's device. Other functions may include other basic phone settings such as listing blocked calls, etc.

Figure 3:
FIG. 3 illustrates an exemplary telephone management database that may be used with a system for providing for telephone management.

FIG. 3 illustrates an exemplary telephone management database 300 that may be used with a system for providing for telephone management. Such a database 300 may track such information regarding telephone calls, such as record ID 305, telephone number 310, share numbers 315, share geo 320, access vCard 325, photo image 330, share security 335, record on 340, store text 345, send text 350, viewing remote 355, async call 360, and third party 365 (e.g., xxx.com may be a site of a security system).

Record 305 is a field for displaying the record number of a call made by user. For example, 100-series numbers are the record numbers of phone calls made by a first user, 200-series numbers are the record numbers of phone calls made by a second user, and 300-series numbers are the record numbers of phone calls made by a third user.

Number 310 is a field for displaying a user's (e.g., of the mobile device with which a telephone call is proceeding) phone number. For example, 802-444-1211 is the phone number of a first user, 617-344-1200 is the phone number of a second user, and 515-616-3121 is the phone number of a third user. Each user's phone number may be input by the user in the share database sub-user interface described with reference to FIG. 5.

Share numbers 315 is a field for displaying the phone numbers of contacts that a user has selected for sharing advanced phone communications. The user selected contacts may be input by the user in the share database sub-user interface described with reference to FIG. 5.

Share geo 320 is a field for displaying a user's selected setting for sharing (Y) geolocation data or not sharing (N) geolocation data. The user's selection to share geolocation data or not to share geolocation data may be set in the advanced phone settings of FIG. 2.

Access vCard 325 is a field for displaying a user's selected setting for allowing (Y) vCard access or not allowing (N) vCard access. The user's selection to allow or not allow vCard access may be set in the advanced phone settings of FIG. 2.

Photo image 330 is a field for displaying a user's selected setting for allowing (Y) or not allowing (N) their photo image to be sent during a phone call. The user's selection to allow their photo to be sent or to receive another user's photo may be set in the advanced phone settings of FIG. 2.

Share security 335 is a field for displaying a user's selected setting for turning security functions on (Y) or off (N). The user's selection to turn share security functions On or Off may be set in the advanced phone settings of FIG. 2.

Record on 340 is a field for displaying a user's selected settings for allowing (Y) or not allowing (N) a phone call to be recorded. The user's selections for recording a phone call may be set in the advanced phone settings of FIG. 2 and the recorder sub-user interface described with reference to FIG. 5.

Store text 345 is a field for displaying a user's selected settings for allowing (Y) or not allowing (N) a phone call to be converted to text. The user's selections for converting a phone call to text may be set in the advanced phone settings of FIG. 2 and the text sub-user interface described with reference to FIG. 5.

Send text 350 is a field for displaying a user's selected settings for allowing (Y) or not allowing (N) a text transcription of a phone call to be sent to a user's email. The user's selections for sending a text transcription may be set in the advanced phone settings of FIG. 2 and the text sub-user interface described with reference to FIG. 5.

Viewing remote 355 is a field for displaying a user's selected settings for allowing (Y) or not allowing (N) their browser content to be viewed remotely. The user's selection to allow or not to allow remote viewing may be set in the advanced phone settings of FIG. 2.

Async call 360 is a field for displaying a user's selected settings for allowing (Y) or not allowing (N) asynchronous calling. The user's selection to allow or not to allow asynchronous calling may be set in the advanced phone settings of FIG. 2.

Third party 365 is a field for displaying a user's selected settings for allowing (Y) or not allowing (N) a third party access to the data stored in the phone share database. The user's selections for allowing third party access may be set in the advanced phone settings of FIG. 2 and the third party sub-user interface described with reference to FIG. 5.

Such records in database 300 may be ordered by any type of data. As illustrated, the table is listed by telephone number 310. Each row represents data related to different telephone numbers 310. For example, first number data 370 relates to the phone number 802-444-1211; second number data 375 relates to the phone number 617-344-1200; and third number data 380 relates to the phone number 515-616-3121.

Figure 4B:
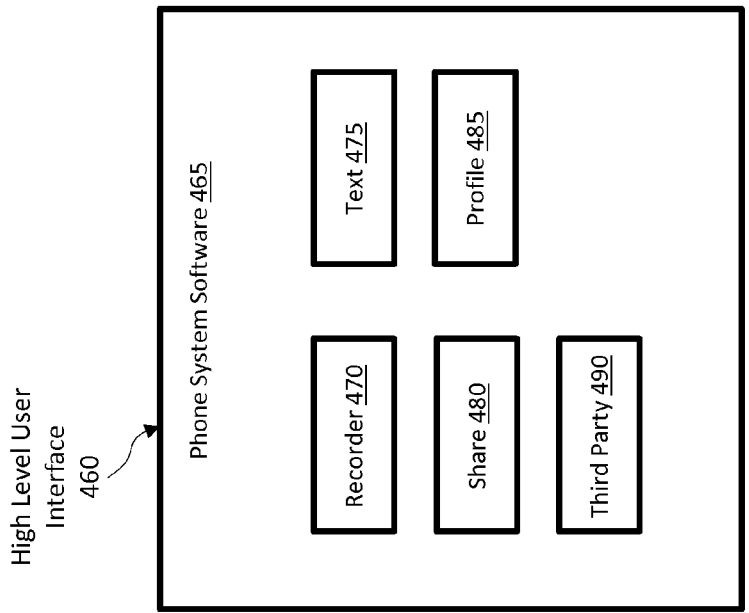
FIGS. 4A and 4B illustrate exemplary user interfaces on a mobile device that may be used with a system for providing for telephone management.
Figure 4A:
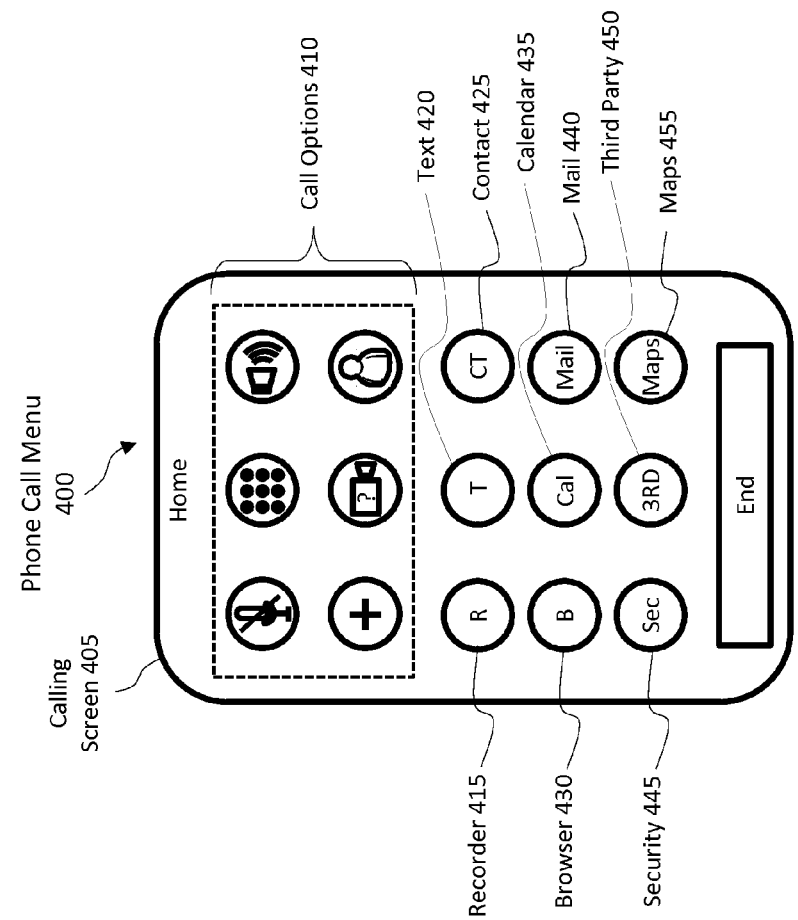

FIGS. 4A and 4B illustrate exemplary user interfaces on a mobile device that may be used with a system for providing for telephone management. FIG. 4A specifically illustrates a phone call menu 400, which includes a calling screen 405.

Calling screen 405 is a screen that is displayed when a call is made. The calling screen displays the various calling options that are available. The calling screen allows a user to readily turn the available options on and off during a phone call. Such calling screen 405 may include standard call options 410 (e.g., mute, keypad, speaker, add a caller, videoconference, and contacts), recorder 415, text 420, contact 425, browser 430, calendar 435, mail 440, security 445, third party 450, and maps 455.

Recorder 415 is a user interface button that may be used to turn recorder functions on and off during a phone call. Text 420 is a user interface button that may be used to turn text functions on and off during a phone call. Contact 425 is a user interface button that may be used to turn contact functions on and off during a phone call. Browser 430 is a user interface button that may be used to turn remote viewing of a user's browser content on and off during a phone call. Calendar 435 is a user interface button that may be used to turn calendar functions on and off during a phone call.

Mail 440 is a user interface button that may be used to turn email functions on and off during a phone call. Security 445 is a user interface button that may be used to turn security functions on and off during a phone call. Third party 450 is a user interface button that may be used to turn third party functions on and off during a phone call. Maps 455 is a user interface button that may be used to turn geolocation functions on and off during a phone call.

FIG. 4B illustrates a high level user interface 460 of phone system software 465, which comprises recorder 470, text 475, share 480, profile 485, and third party 490. High level user interface 460 is a user interface that may be used for setting phone system software functions. The high level user interface includes several user interface buttons that may be used to access a sub-user interface for setting phone system software functions. Phone system software 465 is a computer program for selecting phone system settings that may be used to control the interaction of various applications set in the OS and the user device.

Recorder 470 is a user interface button that may be used to open a sub-user interface that may be used to set recorder functions in the phone system software. The recorder sub-user interface is described in more detail with reference to FIG. 5.

Text 475 is a user interface button that may be used to open a sub-user interface that may be used to set text functions in the phone system software. The text sub-user interface is described in more detail with reference to FIG. 5.

Share 480 is a user interface button that may be used to open a sub-user interface that may be used to input user information (e.g., a user's phone number or other contact information) and data store options in the phone system software. The share sub-user interface is described in more detail with reference to FIG. 5.

Profile 485 is a user interface button that may be used to open a sub-user interface to view profile data in a database.

Third party 490 is a user interface button that may be used to open a sub-user interface that may be used to allow third party access to user information stored in the phone share database. The third party sub-user interface is described in more detail with reference to FIG. 5.

Figure 5:
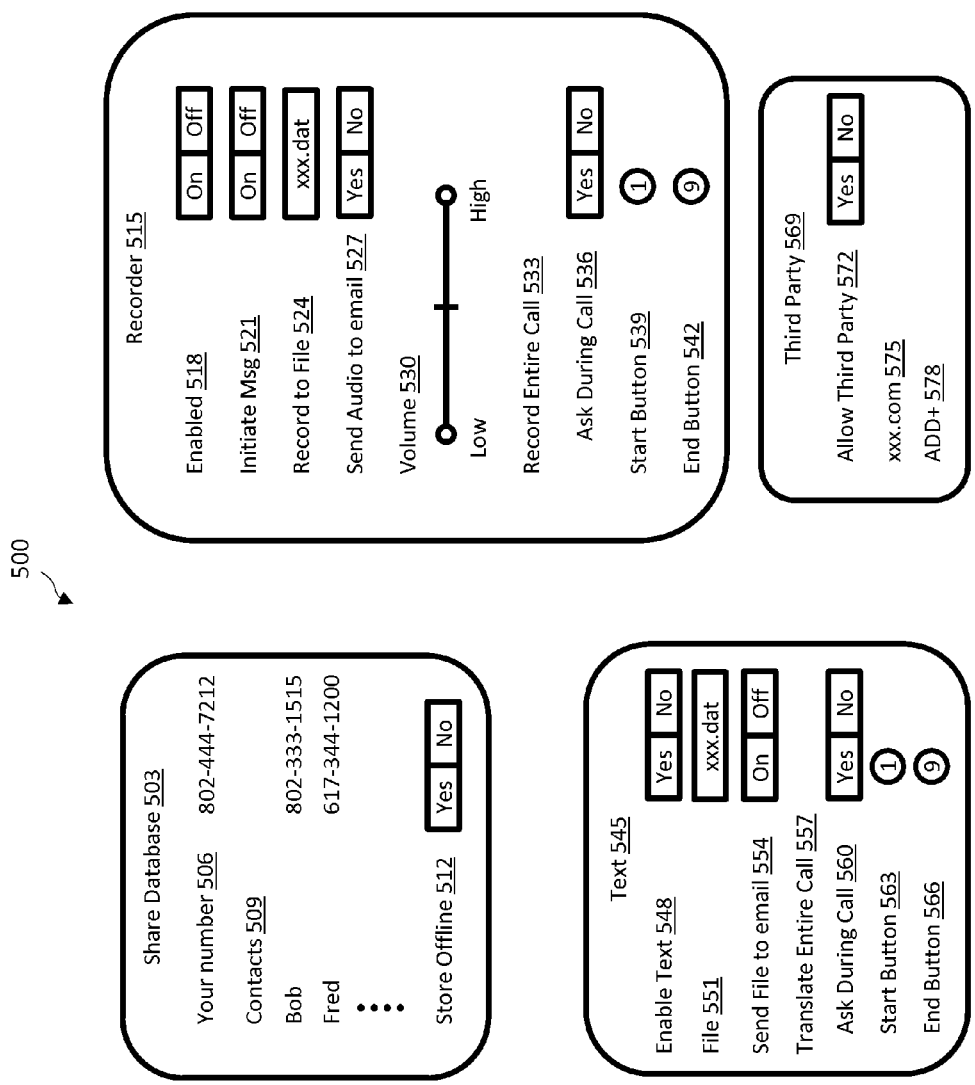
FIG. 5 illustrates exemplary sub-options on a mobile device that may be used with a system for providing for telephone management.

FIG. 5 illustrates exemplary additional user interfaces 500 with various sub-options on a mobile device that may be used with a system for providing for telephone management. Such options may be specifically related to share database 503, recorder 515, text 545, and third party 569.

Share database 503 is a sub-user interface that may be used to input a user's phone number and one or more contacts for sharing advanced phone communications. Share database 503 options may identify a specific user number 506, as well the numbers of their contacts 509 (e.g., Bob, Fred, etc.) with whom the user wishes to share telephone data. In addition, share database 503 may have an option to store offline 512.

Your number 506 is an interactive element for inputting a user's phone number. Contacts 509 is an interactive element for inputting one or more contacts and their phone numbers (e.g., Bob 802-333-1515 and Fred 617-344-1200) that the user has selected for sharing advanced phone communications. Store offline 512 may be used to select to store phone share data in the phone share database offline rather than just in the local database. Store offline 512 may include buttons that may be used to select (Yes) to store data offline in the phone share database or not (No) to store data offline in the phone share database.

Recorder 515 is a sub-user interface that may be used to control the recorder activity of the user device. Recorder 515 options may be enabled 518 to perform such functions as initiating messages 521 (e.g., to notify call participants that the call is being recorded, recording to file 524, sending audio to email 527, setting volume 530, recording an entire call 533, asking during a call 536 (e.g., regarding when to start and stop recording), setting a start button 539, and setting an end button 542.

Enabled 518 may be used to turn the recorder on (On) or off (Off). Initiate message 521 may be used to initiate a message to inform a user that the phone call is being recorded. Initiate msg 521 may include buttons that may be used to initiate a message (On) that the phone call is being recorded or not to initiate a message (No) that the phone call is being recorded (e.g., the message may be recorded without informing a user).

Record to file 524 may include a dialog box for inputting a file destination (e.g., xxx.dat) for a phone call recording. Send audio to email 527 may be used to send the audio recording of the phone call to a user's email. Send audio to email includes, for example, buttons that may be used to select to send (Yes) the audio recording to a user's email or not (No) to send the audio recording to a user's email.

Setting volume 530 may be an interactive element for adjusting the recording volume and may include a slider (track bar) that may be used to set the sound level in a range from Low to High. Recording an entire call 533 may be used to record the entire phone call. Ask during a call 536 may be used to ask a user during a phone call when a recording of the phone call may start and end. Ask during call 536 may include buttons that may be used to select ask during call (Yes) or do not ask during call (No). Set a start button 539 may be used to start the recording of a phone call. In one example, button number 1 may be defined as the start button. Set an end button 542 may be used to end the recording of a phone call. In one example, button number 9 may be defined as the end button.

Text 545 may be a sub-user interface that may be used to control the speech-to-text conversion activity of the user device. Text 545 options may be enabled 548 to perform such functions as setting a text file name 551, sending a file to email 554, translating an entire call 557, asking during a call 560, setting a start button 563, and setting an end button 566. Third party 569 options may be enabled to allow third party sharing 572 (e.g., via a third party database), identify a specific URL 575 (e.g., of a security system), and add further parties 578.

Enable 548 may be used to enable translation (or other conversion) of a phone call (audio) to text. Enable 548 may include buttons that may be used to select (Yes) to enable conversion of the phone call to text or not (No) to enable conversion of the phone call to text.

Set a text file name 551 may include a dialog box for inputting a file destination (e.g., xxx.dat) for storing the text file of the phone call. Send a file to email 554 may be used to send the text file of the phone call to a user's email. Send file to email 554 may include buttons that may be used to select (Yes) to send the text file to a user's email or not (No) to send the text file to a user's email. Translating an entire call 557 may be used to translate (convert) the entire phone call.

Ask during a call 560 may be used to ask a user during a phone call when translation of the phone call to text may start and end. Ask during call includes, for example, buttons that may be used to select ask during call (Yes) or do not ask during call (No). Set a start button 563 may be used to start the translation of a phone call to text. In one example, button number 1 may be defined as the start button. Set an end button 566 may be used to end the translation of a phone call to text. In one example, button number 9 may be defined as the end button.

Third party 569 may be a sub-user interface that may be used to input one or more third parties that may access data stored in the phone share database. Third party 569 options may be enabled to allow third party sharing 572 (e.g., via a third party database), identify a specific URL 575 (e.g., of a security system), and add further parties 578.

Allow third party 572 may be used to allow a third party to access a user's information stored in the phone share database. Allow third party 572 may include a button that may be used to allow (Yes) or not allow (No) a third party access to a user's information in the phone share database. Option 575 is an interactive element for inputting a third party that is allowed to access the information in the phone share database. The third party may be, for example, a security system having the URL xxx.com. Add further parties 578 may be used to add additional third parties that may be allowed to access a user information stored in the phone share database.

Figure 6:
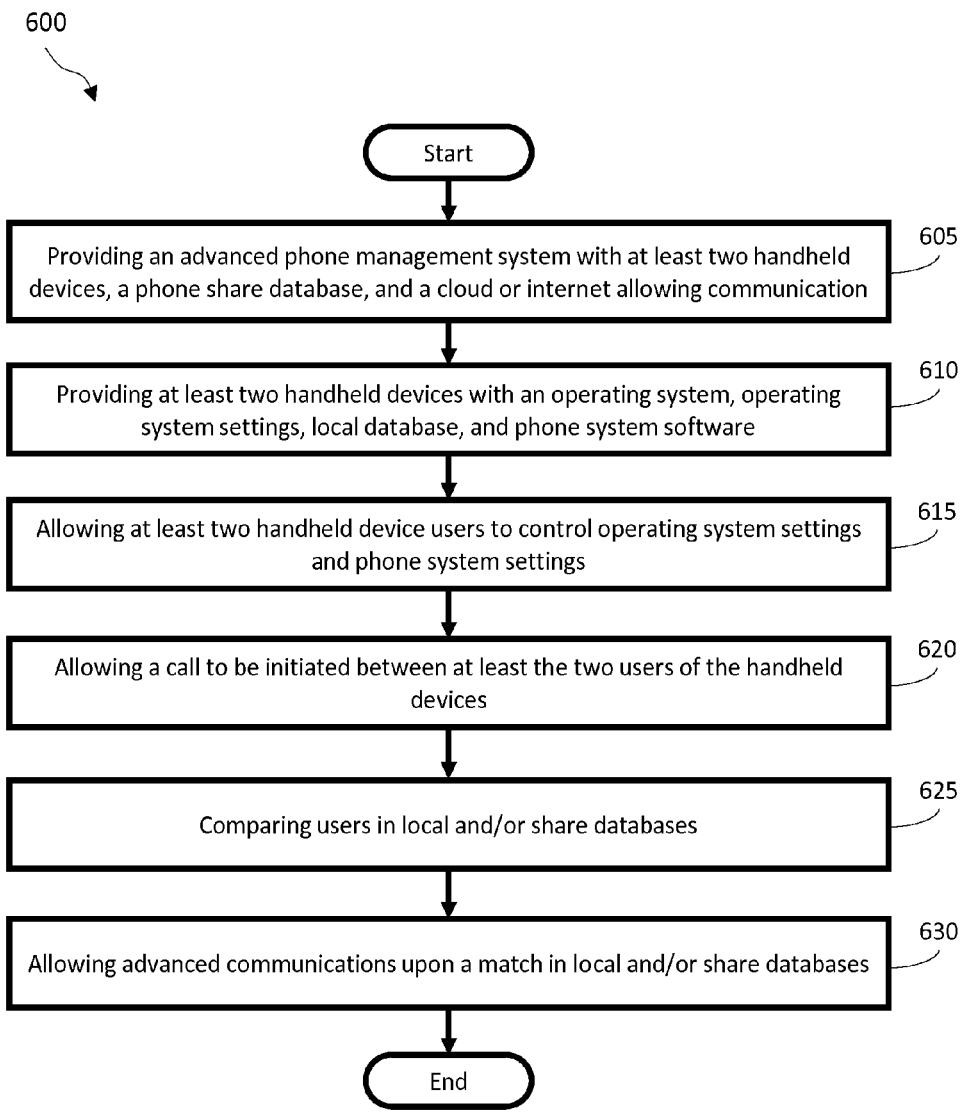
FIG. 6 is a flowchart illustrating an exemplary method for providing for telephone management.

FIG. 6 is a flowchart illustrating an exemplary method 600 for providing for telephone management. In step 605, an advanced telephone management system is provided. Such a system may be used by multiple users devices and may further include a telephone share database. Such user devices and telephone share database may communicate data over a communication network (e.g., cloud, Internet).

In step 610, one or more user devices may be installed with a certain operating system, which may have certain operating system settings allowing for telephone management. Such user devices may further be provided with local database space for storing data related to telephone management, as well as certain software (e.g., application) for managing telephone call data.

In step 615, a user may designate certain settings in accordance with their preferences regarding sharing of telephone call data. Such settings may include operating system settings, as well as settings specific to the particular software or application for managing telephone call data.

In step 620, a call may be initiated between two devices that are enabled for sharing of telephone call data. The call may be initiated in accordance with any system known in the art for connecting one mobile device to another mobile device for telephone communications.

In step 625, the mobile devices involved in the call of step 620 may each respectively look up the information (e.g., telephone number) of the other device in a local database. Such a database may indicate that the user had previously allowed for sharing with that device, as well as the type of telephone data that may be shared.

In step 630, the mobile device allows the user to manipulate telephone call data in various ways. Such ways may include recording, sharing, and other functions described in detail herein. The manipulation of the telephone call data may further involve communicating and sharing such data with various parties.

Figure 7A:
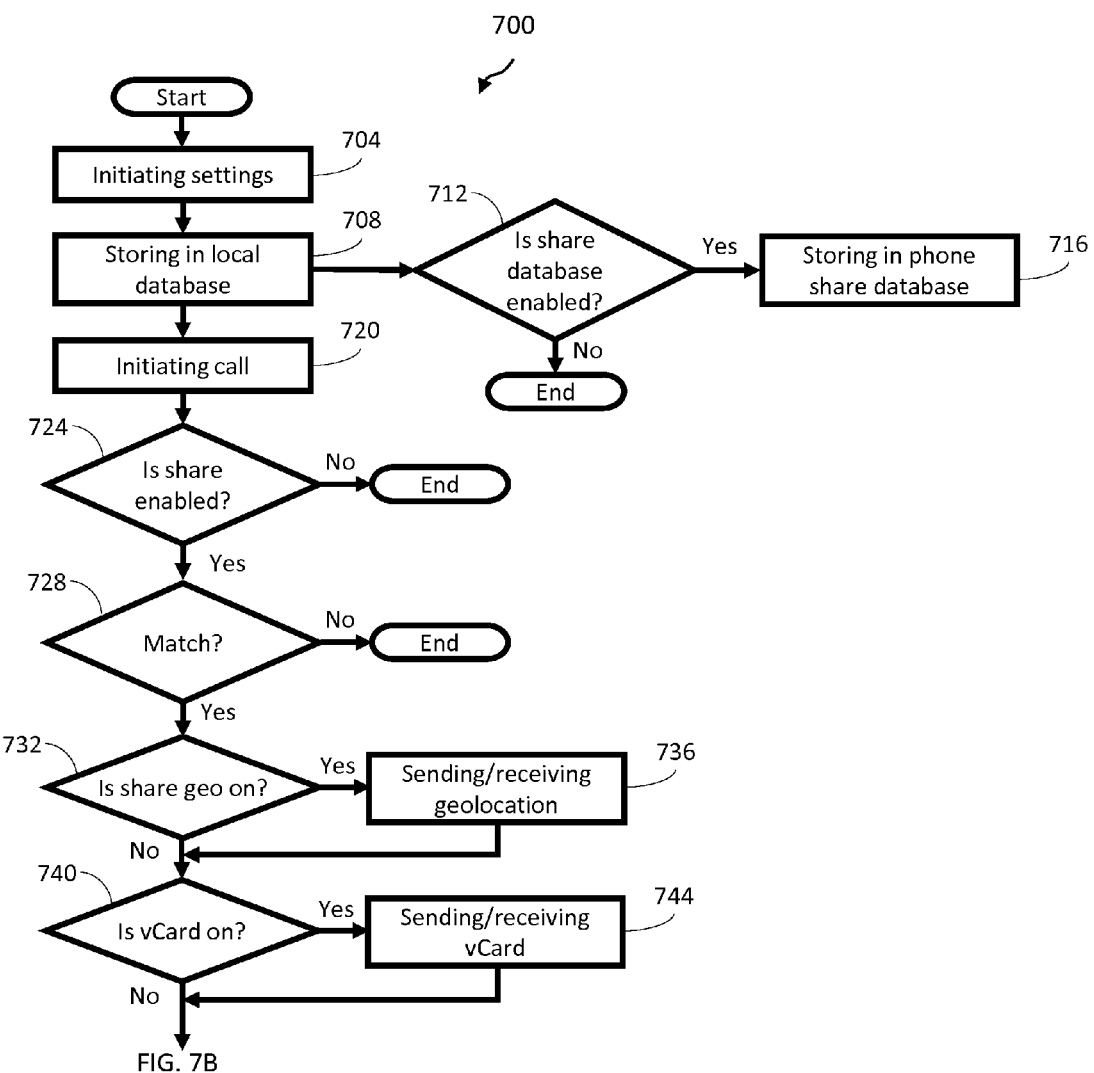
FIGS. 7A and 7B collectively provide a flowchart illustrating an alternate exemplary method for providing for telephone management.
Figure 7B:
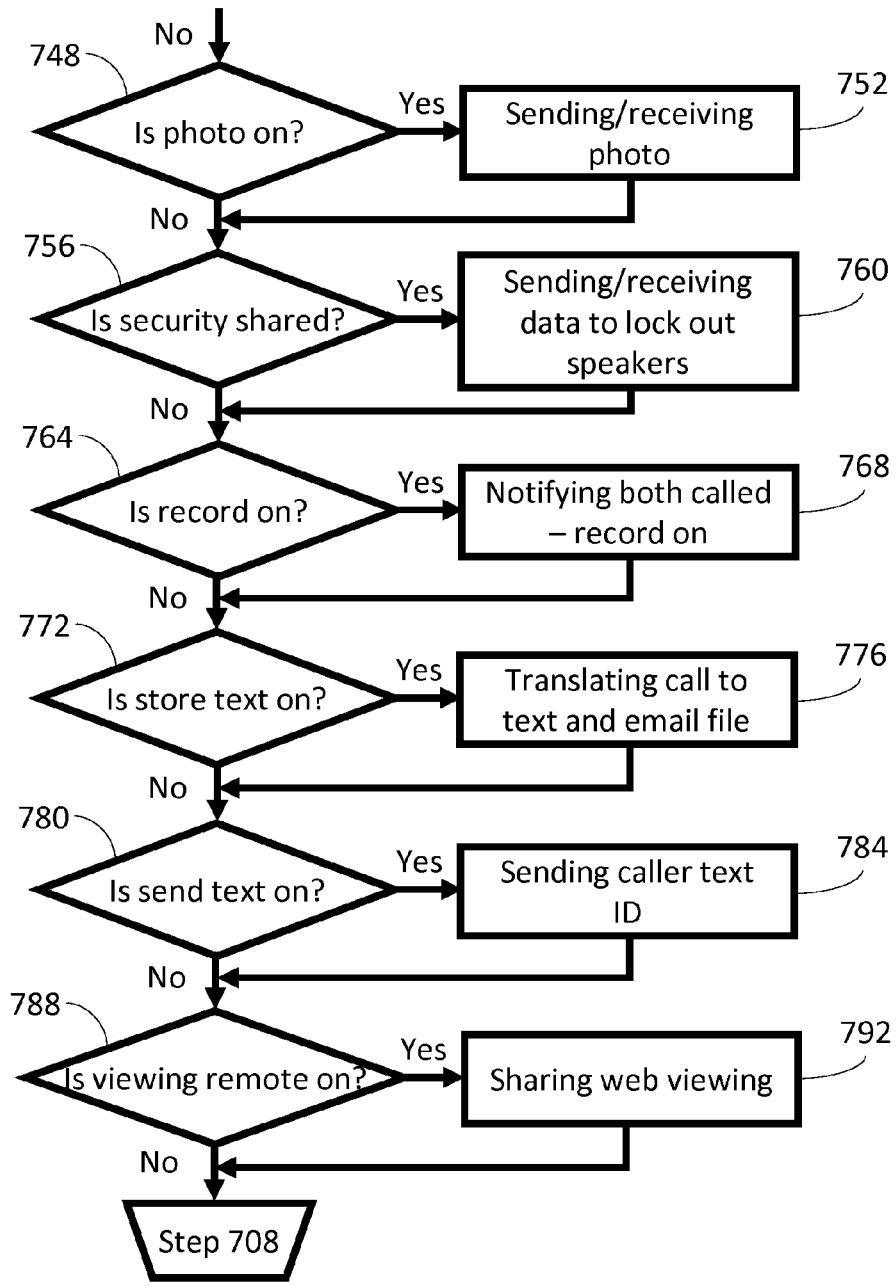

FIGS. 7A and 7B collectively provide a flowchart illustrating an alternate exemplary method 700 for providing for telephone management. In step 704, users may input settings much like they do in corresponding step 615.

In step 708, such settings may be stored in a local database. It may be determined whether the settings are to be shared in step 712. If not, the method may end. If sharing is enabled, the settings may be sent to a remote telephone share database for storage in step 716.

In step 720, a telephone call may be initiated between at least two user devices as known in the art. In step 724, it may be determined whether each of the user devices is enabled for sharing of telephone call data. If not, the method may end. If so, the method may proceed to step 728. In step 728, it may be determined whether the user devices have allowed for sharing of telephone call data with each other (e.g., whether the telephone number of the other device matches one previously designated as allowed to receive telephone call data). If there is no match, the method may end. If there is a match, the method may proceed to determine what type of information may be shared in subsequent steps 732-788.

In step 732, it may be determined for a first user device whether the user has agreed to share geolocation data with the other user device. If so, such data may be shared between the two devices (e.g., both sending and receiving) in step 736. If not, the method may proceed to consider other types of telephone call data.

In step 732, it may be determined for a first user device whether the user has agreed to share geolocation data with the other user device. If so, such data may be shared between the two devices (e.g., both sending and receiving) in step 736. If not, the method may proceed to consider other types of telephone call data.

In step 740, it may be determined for a first user device whether the user has agreed to share v-Card data with the other user device. If so, such data may be shared between the two devices (e.g., both sending and receiving) in step 744. If not, the method may proceed to consider other types of telephone call data.

In step 748, it may be determined for a first user device whether the user has agreed to share photo data with the other user device. If so, such data may be shared between the two devices (e.g., both sending and receiving) in step 752. If not, the method may proceed to consider other types of telephone call data.

In step 756, it may be determined for a first user device whether the user has agreed to share security data with the other user device. If so, such data (e.g., regarding locking out speakerphone on the other device) may be shared between the two devices (e.g., both sending and receiving) in step 760. If not, the method may proceed to consider other types of telephone call data.

In step 764, it may be determined for a first user device whether the user has agreed to allow recording with the other user device. If so, a recording notification may be communicated between the two devices in step 768. If not, the method may proceed to consider other types of telephone call data.

In step 772, it may be determined for a first user device whether the user has agreed to allow transcription into text. If so, the audio content of the telephone call may be transcribed and converted into text in step 776. If not, the method may proceed to consider other types of telephone call data.

In step 780, it may be determined for a first user device whether the user has agreed to allow for sharing of the text data (e.g., transcribed in step 772). If so, a caller text ID may be sent in step 784. If not, the method may proceed to consider other types of telephone call data.

In step 788, it may be determined for a first user device whether the user has agreed to allow for viewing of remote data. If so, such data may be shared (e.g., via web viewing) between the two devices (e.g., both sending and receiving) in step 792. If not, the method may return to step 708 for further evaluation with respect to other user devices.

Figure 8:
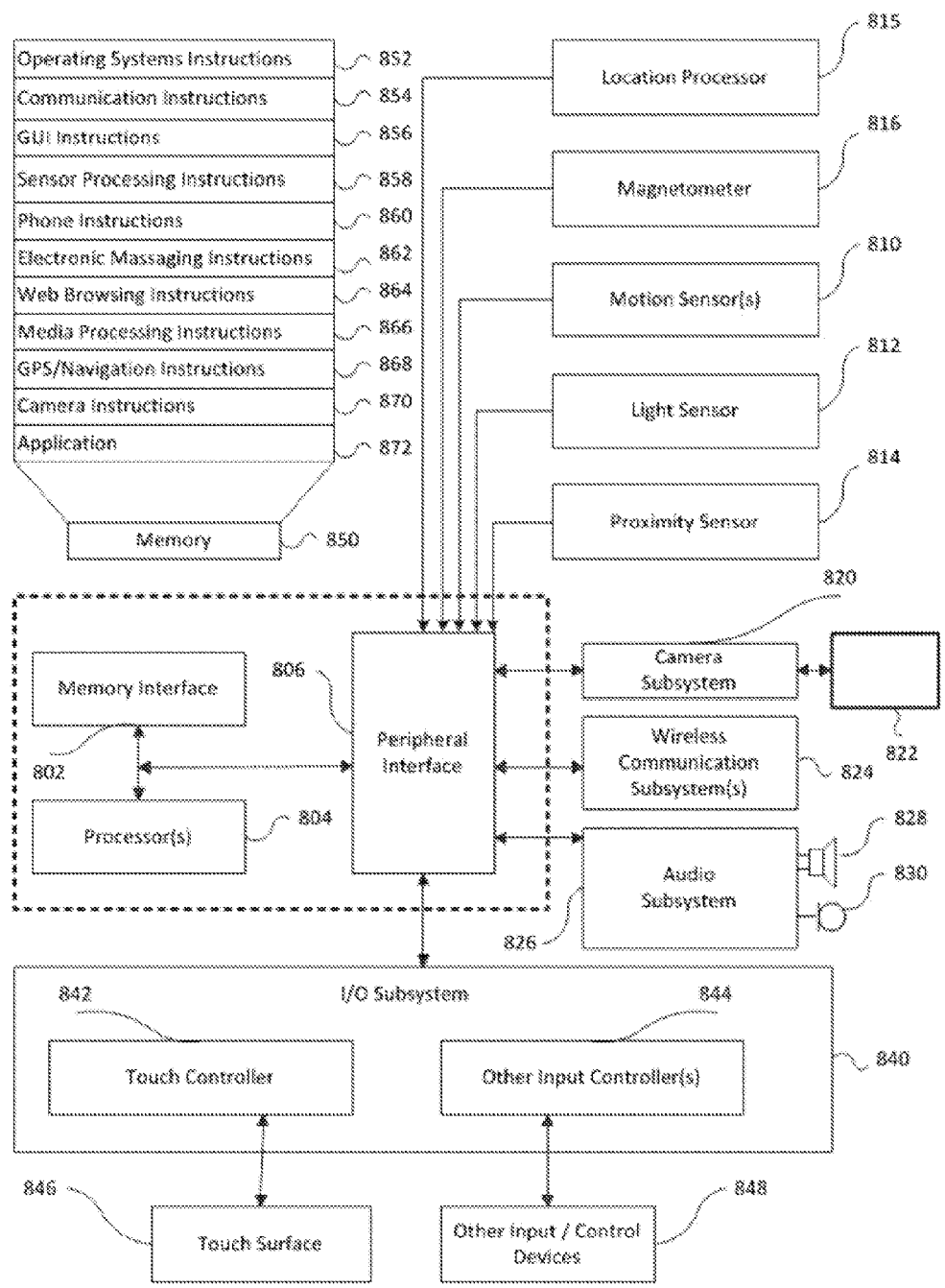
FIG. 8 illustrates a mobile device architecture that may be utilized to implement the various features and processes described herein.

FIG. 8 illustrates a mobile device architecture that may be utilized to implement the various features and processes described herein. Architecture 800 can be implemented in any number of portable devices including but not limited to smart phones, electronic tablets, and gaming devices. Architecture 800 as illustrated in FIG. 8 includes memory interface 802, processors 804, and peripheral interface 806. Memory interface 802, processors 804 and peripherals interface 806 can be separate components or can be integrated as a part of one or more integrated circuits. The various components can be coupled by one or more communication buses or signal lines.

Processors 804 as illustrated in FIG. 8 are meant to be inclusive of data processors, image processors, central processing unit, or any variety of multi-core processing devices. Any variety of sensors, external devices, and external subsystems can be coupled to peripherals interface 806 to facilitate any number of functionalities within the architecture 800 of the exemplar mobile device. For example, motion sensor 810, light sensor 812, and proximity sensor 814 can be coupled to peripherals interface 806 to facilitate orientation, lighting, and proximity functions of the mobile device. For example, light sensor 812 could be utilized to facilitate adjusting the brightness of touch surface 846. Motion sensor 810, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 806, such as a temperature sensor, a biometric sensor, or other sensing device to facilitate corresponding functionalities. Location processor 815 (e.g., a global positioning transceiver) can be coupled to peripherals interface 806 to allow for generation of geolocation data thereby facilitating geopositioning. An electronic magnetometer 816 such as an integrated circuit chip could in turn be connected to peripherals interface 806 to provide data related to the direction of true magnetic North whereby the mobile device could enjoy compass or directional functionality. Camera subsystem 820 and an optical sensor 822 such as a charged coupled device (CCD) or a complementary metal-oxide semiconductor (CMOS) optical sensor can facilitate camera functions such as recording photographs and video clips.

Communication functionality can be facilitated through one or more communication subsystems 824, which may include one or more wireless communication subsystems. Wireless communication subsystems 824 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 824 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 824 may include hosting protocols such that the device may be configured as a base station for other wireless devices. Communication subsystems can also allow the device to synchronize with a host device using one or more protocols such as TCP/IP, HTTP, or UDP.

Audio subsystem 826 can be coupled to a speaker 828 and one or more microphones 830 to facilitate voice-enabled functions. These functions might include voice recognition, voice replication, or digital recording. Audio subsystem 826 in conjunction may also encompass traditional telephony functions.

I/O subsystem 840 may include touch controller 842 and/or other input controller(s) 844. Touch controller 842 can be coupled to a touch surface 846. Touch surface 846 and touch controller 842 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 846 may likewise be utilized. In one implementation, touch surface 846 can display virtual or soft buttons and a virtual keyboard, which can be used as an input/output device by the user.

Other input controllers 844 can be coupled to other input/control devices 848 such as one or more buttons, rocker switches, thumb-wheels, infrared ports, USB ports, and/or a pointer device such as a stylus. The one or more buttons (not shown) can include an up/down button for volume control of speaker 828 and/or microphone 830. In some implementations, device 800 can include the functionality of an audio and/or video playback or recording device and may include a pin connector for tethering to other devices.

Memory interface 802 can be coupled to memory 850. Memory 850 can include high-speed random access memory or non-volatile memory such as magnetic disk storage devices, optical storage devices, or flash memory. Memory 850 can store operating system 852, such as Darwin, RTXC, LINUX, UNIX, OS X, ANDROID, WINDOWS, or an embedded operating system such as VXWorks. Operating system 852 may include instructions for handling basic system services and for performing hardware dependent tasks. In some implementations, operating system 852 can include a kernel.

Memory 850 may also store communication instructions 854 to facilitate communicating with other mobile computing devices or servers. Communication instructions 854 can also be used to select an operational mode or communication medium for use by the device based on a geographic location, which could be obtained by the GPS/Navigation instructions 868. Memory 850 may include graphical user interface instructions 856 to facilitate graphic user interface processing such as the generation of an interface; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes, camera instructions 870 to facilitate camera-related processes and functions; and instructions 872 for any other application that may be operating on or in conjunction with the mobile computing device. Memory 850 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 850 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for providing telephone management, the method comprising:
    storing information in memory of a first mobile device, wherein the stored information concerns a plurality of settings, wherein each setting identifies whether an action of a plurality of available actions is executable during a telephone call;
    connecting a telephone call between the first mobile device and a second mobile device;
    receiving an action request during the telephone call via a user interface of the first mobile device, wherein the action request identifies a subset comprising one or more of the plurality of actions, each action in the subset identified by the stored settings as executable during the telephone call; and
    executing instruction stored in memory, wherein execution of the instructions by a processor performs the subset of one or more actions during the telephone call between the first mobile device and the second mobile device, the subset of one or more actions including preventing the second mobile device from activating speakerphone audio output during the telephone call, wherein other audio outputs are permitted during the telephone call.

2. The method of claim 1, wherein the subset of one or more actions further includes recording audio content of the telephone call with the second mobile device.

3. The method of claim 1, wherein the subset of one or more actions further includes converting audio content of the telephone call with the second mobile device into text content.

4. The method of claim 1, wherein the subset of one or more actions further includes transmitting a transmission to the second mobile device during the telephone call.

5. The method of claim 4, wherein the transmission comprises an email sent over a communication network.

6. The method of claim 4, wherein the transmission comprises a text message sent over a communication network.

7. The method of claim 4, wherein the transmission comprises contact data sent over a communication network.

8. The method of claim 1, wherein the subset of one or more actions further includes providing the telephone call data to an application, and further comprising executing the application to use the telephone call data.

9. The method of claim 4, wherein the transmission comprises historical call data.

10. The method of claim 1, wherein the first set of one or more actions includes preventing the second mobile device from activating ear-bud audio output during the telephone call.

11. An apparatus for providing telephone management, the apparatus comprising:
    memory that stores information at a first mobile device, the stored information concerning a plurality of settings, wherein each setting identifies whether an action of a plurality of available actions is executable during a telephone call;
    a telephone interface that connects a telephone call between the first mobile device and a second mobile device;
    a user interface that receives an action request during the telephone call, wherein the action request identifies a subset comprising one or more of the plurality of actions, each action in the subset identified by the stored settings as executable during the telephone call with the second mobile device;
    a processor of the first mobile device that executes instructions stored in memory of the first mobile device, wherein execution of the instructions by the processor performs the subset of one or more actions during the telephone call between the first mobile device and the second mobile device, the subset of one or more actions including preventing the second mobile device from activating speakerphone audio output during the telephone call, wherein other audio outputs are permitted during the telephone call.

12. The apparatus of claim 11, wherein the subset of one or more actions further includes recording audio content of the telephone call with the second mobile device.

13. The apparatus of claim 11, wherein the subset of one or more actions further includes converting audio content of the telephone call with the second mobile device into text content using voice recognition.

14. The apparatus of claim 11, wherein the subset of one or more actions further includes transmitting a transmission to the second mobile device over a communication network during the telephone call.

15. The apparatus of claim 14, wherein the transmission comprises an email sent over the communication network.

16. The apparatus of claim 14, wherein the transmission comprises a text message sent over the communication network.

17. The apparatus of claim 14, wherein the transmission comprises contact data sent over the communication network.

18. The apparatus of claim 11, wherein the subset of one or more actions includes executing a software application stored in the memory of the first mobile device during the telephone call.

19. The apparatus of claim 11, wherein the transmission comprises historical call data.

20. The apparatus of claim 14, wherein the subset of one or more actions includes preventing the second mobile device from activating ear-bud audio output during the telephone call.

21. A non-transitory computer-readable storage medium, having embodied thereon a program executable by a processor to perform a method for providing telephone management, the method comprising:

storing information in memory of a first mobile device, wherein the stored information concerns a plurality of settings, wherein each setting identifies whether an action of a plurality of available actions is executable during a telephone call;

connecting a telephone call between the first mobile device and a second mobile device;

receiving an action request during the telephone call from a user interface of the first mobile device, wherein the action request identifies a subset comprising one or more of the plurality of actions, each action in the subset identified by the stored settings as executable during the telephone call; and performing the subset of one or more actions during the telephone call between the first mobile device and the second mobile device, the subset of one or more actions including preventing the second mobile device from activating speakerphone audio output during the telephone call, wherein other audio outputs are permitted during the telephone call.

\* \* \* \* \*